United States Patent
Mihcak et al.

(10) Patent No.: US 7,318,157 B2
(45) Date of Patent: *Jan. 8, 2008

(54) DERIVATION AND QUANTIZATION OF ROBUST NON-LOCAL CHARACTERISTICS FOR BLIND WATERMARKING

(75) Inventors: M. Kivanc Mihcak, Redmond, WA (US); Ramarathnam Venkatesan, Redmond, WA (US); Mariusz H. Jakubowski, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 433 days.

This patent is subject to a terminal disclaimer.

(21) Appl. No.: 10/987,058

(22) Filed: Nov. 12, 2004

(65) Prior Publication Data

US 2005/0108543 A1 May 19, 2005

Related U.S. Application Data

(63) Continuation of application No. 09/843,279, filed on Apr. 24, 2001, now Pat. No. 7,020,775.

(51) Int. Cl.
G06K 9/00 (2006.01)
G06K 9/34 (2006.01)

(52) U.S. Cl. .................. 713/176; 380/54; 380/201; 382/251

(58) Field of Classification Search ........... 713/176; 380/54, 201; 382/251
See application file for complete search history.

(56) References Cited

U.S. PATENT DOCUMENTS

| | | | |
|---|---|---|---|
| 4,773,039 A | 9/1988 | Zamora | |
| 5,093,869 A | 3/1992 | Alves et al. | |
| 5,210,820 A | 5/1993 | Kenyon | |
| 5,351,310 A | 9/1994 | Califano et al. | |
| 5,425,081 A | 6/1995 | Gordon et al. | |
| 5,465,353 A | 11/1995 | Hull et al. | |
| 5,535,020 A | 7/1996 | Ulichney | |
| 5,613,004 A | 3/1997 | Cooperman et al. | |
| 5,664,016 A | 9/1997 | Preneel et al. | |
| 5,687,236 A | 11/1997 | Moskowitz et al. | |
| 5,689,639 A | 11/1997 | Schwarz | |
| 5,734,432 A * | 3/1998 | Netravali et al. | 375/240.05 |
| 5,774,588 A | 6/1998 | Li | |
| 5,802,518 A | 9/1998 | Karaev et al. | |

(Continued)

FOREIGN PATENT DOCUMENTS

EP        0581317        2/1994

(Continued)

OTHER PUBLICATIONS

Mihcak et al.; "Watermarking via optimization algorithms for quantizing randomized semi-global image statistics"; research.microsoft.com/~kivancm/publications/mvl04_rev2.pdf ; Springer-Verlag; Jul. 12, 2005; pp. 1-16.*

(Continued)

*Primary Examiner*—Gilberto Barrón, Jr.
*Assistant Examiner*—Jung Kim
(74) *Attorney, Agent, or Firm*—Lee & Hayes, PLLC

(57) ABSTRACT

An implementation of a technology is described herein for deriving robust non-local characteristics and quantizing such characteristics for blind watermarking of a digital good.

34 Claims, 6 Drawing Sheets

U.S. PATENT DOCUMENTS

| | | | |
|---|---|---|---|
| 5,809,498 A | 9/1998 | Lopresti et al. | |
| 5,875,264 A | 2/1999 | Carlstrom | |
| 5,899,999 A | 5/1999 | De Bonet | |
| 5,915,038 A | 6/1999 | Abdel-Mottaleb et al. | |
| 5,918,223 A | 6/1999 | Blum et al. | |
| 5,953,451 A | 9/1999 | Syeda-Mahmood | |
| 6,081,893 A | 6/2000 | Grawrock et al. | |
| 6,101,602 A | 8/2000 | Fridrich | |
| 6,246,777 B1 | 6/2001 | Agarwal et al. | |
| 6,249,616 B1 | 6/2001 | Hashimoto | |
| 6,278,385 B1* | 8/2001 | Kondo et al. | 341/50 |
| 6,314,192 B1 | 11/2001 | Chen et al. | |
| 6,321,232 B1 | 11/2001 | Syeda-Mahmood | |
| 6,363,381 B1 | 3/2002 | Lee et al. | |
| 6,363,463 B1 | 3/2002 | Mattison | |
| 6,370,272 B1 | 4/2002 | Shimizu | |
| 6,377,965 B1 | 4/2002 | Hachamovitch et al. | |
| 6,385,329 B1* | 5/2002 | Sharma et al. | 382/100 |
| 6,401,084 B1 | 6/2002 | Ortega et al. | |
| 6,418,430 B1 | 7/2002 | DeFazio et al. | |
| 6,477,276 B1 | 11/2002 | Inoue et al. | |
| 6,513,118 B1 | 1/2003 | Iwamura | |
| 6,522,767 B1 | 2/2003 | Moskowitz et al. | |
| 6,532,541 B1 | 3/2003 | Chang et al. | |
| 6,546,114 B1 | 4/2003 | Venkatesan et al. | |
| 6,574,348 B1 | 6/2003 | Venkatesan et al. | |
| 6,584,465 B1 | 6/2003 | Zhu et al. | |
| 6,625,295 B1 | 9/2003 | Wolfgang et al. | |
| 6,647,128 B1 | 11/2003 | Rhoads | |
| 6,658,423 B1 | 12/2003 | Pugh et al. | |
| 6,658,626 B1 | 12/2003 | Aiken | |
| 6,671,407 B1* | 12/2003 | Venkatesan et al. | 382/232 |
| 6,674,861 B1 | 1/2004 | Xu et al. | |
| 6,687,416 B2 | 2/2004 | Wang | |
| 6,700,989 B1 | 3/2004 | Itoh et al. | |
| 6,701,014 B1 | 3/2004 | Syeda-Mahmood | |
| 6,725,372 B1 | 4/2004 | Lewis et al. | |
| 6,751,343 B1 | 6/2004 | Ferrell et al. | |
| 6,754,675 B2 | 6/2004 | Abdel-Mottaleb et al. | |
| 6,768,809 B2 | 7/2004 | Rhoads et al. | |
| 6,768,980 B1 | 7/2004 | Meyer et al. | |
| 6,771,268 B1 | 8/2004 | Crinon | |
| 6,782,361 B1 | 8/2004 | El-Maleh et al. | |
| 6,799,158 B2 | 9/2004 | Fischer et al. | |
| 6,839,673 B1 | 1/2005 | Choi et al. | |
| 6,864,897 B2 | 3/2005 | Brand | |
| 6,879,703 B2 | 4/2005 | Lin et al. | |
| 6,901,514 B1 | 5/2005 | Iu et al. | |
| 6,907,527 B1 | 6/2005 | Wu | |
| 6,971,013 B2* | 11/2005 | Mihcak et al. | 713/180 |
| 6,973,574 B2* | 12/2005 | Mihcak et al. | 713/180 |
| 6,990,444 B2 | 1/2006 | Hind et al. | |
| 6,990,453 B2 | 1/2006 | Wang et al. | |
| 6,996,273 B2* | 2/2006 | Mihcak et al. | 382/181 |
| 7,095,873 B2* | 8/2006 | Venkatesan et al. | 382/100 |
| 7,152,163 B2* | 12/2006 | Mihcak et al. | 713/180 |
| 2002/0126872 A1 | 9/2002 | Brunk | |
| 2002/0196976 A1 | 12/2002 | Mihcak et al. | |
| 2003/0056101 A1 | 3/2003 | Epstein | |
| 2003/0118208 A1 | 6/2003 | Epstein | |
| 2003/0169269 A1 | 9/2003 | Sasaki et al. | |
| 2005/0065974 A1* | 3/2005 | Mihcak et al. | 707/103 Y |
| 2005/0071377 A1* | 3/2005 | Mihcak et al. | 707/104.1 |
| 2005/0076229 A1* | 4/2005 | Mihcak et al. | 713/189 |
| 2005/0084103 A1* | 4/2005 | Mihcak et al. | 380/202 |
| 2005/0165690 A1* | 7/2005 | Liu et al. | 705/57 |
| 2005/0180500 A1 | 8/2005 | Chiang et al. | |

FOREIGN PATENT DOCUMENTS

| | | |
|---|---|---|
| EP | 1 253 784 | 10/2002 |
| JP | 11-041571 | 2/1999 |
| JP | 2000-004350 | 1/2000 |
| JP | 2000050057 | 2/2000 |
| JP | 2000149004 | 5/2000 |
| JP | 2000261655 | 9/2000 |
| JP | 2000332988 | 11/2000 |
| JP | 2000350007 | 12/2000 |
| WO | WO 99/17537 | 4/1999 |
| WO | WO 99/18723 | 4/1999 |
| WO | WO 99/60514 | 11/1999 |
| WO | WO 01/11890 | 2/2001 |
| WO | WO 01/28230 | 4/2001 |
| WO | WO 02/37331 | 5/2002 |

OTHER PUBLICATIONS

Venkatesan, et al., "Image Hashing", Microsoft Research, Mar. 24, 2000, pp. 1-8.

Chang et al. "Aircraft identification based on the algebraic method" Hybrid Image and Signal Processing III, vol. 1702, Apr. 23, 1992, pp. 298-305.

Kozat S. S. et al., "Robust Preceptual Image Hashing Via Matrix Invariants" Image Processing, 2004. Oct. 24, 2004.

Chang, et al., "RIME: A Replicated Image Detector for the World-wide Web", pp. 10.

Chang et al., "A Spatial Match Representation Scheme for Indexing and Querying In Iconic Image Databases", 1997, ACM, Retrieved from the Internet http://portal.acm.org/citation.cfm?id=266890&coll=ACM&dl=ACM&CFID=68519948&CFTOKEN=85922645.

El-Kwae et al., "Efficient Content-Based indexing of Large Image Databases", Apr. 2000, ACM, Retrieved from the Internet: http://portal.acm.org/citation.cfm?id=348762&coll=ACM&dl=ACM&CFID=68519948&CFTOKEN=85922645.

Lambrou et al, "Classification of Audio Signals using Statistical Features on Time and Wavelet Transform Domains", Accoustics, Speech and Signal Processing, 1998. Proceedings of the 1998 IEEE International Conference on Seattle, WA, USA May 12-15, 1998, New York, NY, USA, IEEE, US, vol. 6, pp. 3621-3624.

Moreno et al., "Using the Fisher Kernal Method for Web Audio Classification", Acoustics, Speech, and Signal Processing, 2000. ICASSP '00. Proceedings. 2000 IEEE International Conference on Jun. 5-9, 2000, Piscataway, NJ, USA, IEEE, vol. 6, pp. 2417-2420.

Pye, D., "Content-Based methods for the Management of Digital Music", Acoustics, Speech , and Signal Processing, 2000. ICASSP '00. Proceedings. 2000 IEEE International Conference on Jun. 5-9, 2000, Piscataway, NJ, USA, IEEE, vol. 6, pp. 2437-2440.

Politis et al., "An Audio Signatures Indexing Scheme for Dynamic Content Multimedia Databases", Electrotechnical Conference, 2000. IEEE, vol. 2, May 29, 2000, pp. 725-728.

Lin et al., "A Robust Image Authentication Method Distinguishing JPEG Compression from Malicious Manipulation", IEEE Transactions, Feb. 2001, vol. 11, No. 2, pp. 153-168.

Schneider et al., "A Robust Content Based Digital Signature for Image Authentication", Proceedings, International Conference, Sep. 1996, vol. 3, pp. 227-230.

M. D. Swanson, B. Zhu and B. Chau, "Object based transparent video watermarking," Proceedings of IEEE Signal Processing Society 1997 Workshop on Multimedia Signal processing, Jun. 23-25, 1997, Princeton, New Jersey, USA.

M. K. Mihcak and R. Venkatesan, "A Tool for robust audio Information hiding: A perceptual audio hashing algorithm," submitted to Workshop on Information Hiding, Pittsburgh, PA, 2001.

T. Kalker and J. Haitsma, "Efficient detection of a spatial spread-spectrum watermark in MPEG video streams," Proc. IEEE ICIP, Vancouver, Canada, Sep. 2000.

I. J. Cox. J. Killian, T. Leighton, and T. Shamoon, "A secure robust watermark for multimedia," Information Hiding Workshop, University of Cambridge, pp. 185-206, 1996.

J. Dittman, M. Stabenau and R. Steinmetz, "Robust MPEG video watermarking technologies," Proceedings of ACM Multimedia '98, The 8th ACM International Multimedia Conference, Bristol, England, pp. 71-80.

B. Chen and G. W. Wornell, "Digital watermarking and information embedding using dither modulation," Proc. IEEE Workshop on Multimedia Signal Processing. Redondo Beach, CA, pp. 273-278, Dec. 1998.

F. A. P. Petitcolas and R. J. Anderson, "Evaluation of copyright marking systems," Proceedings of IEEE Multimedia Systems'99, vol. 1, pp. 574-579. Jun. 7-11, 1999, Florence, Italy.

Chang et al., "RIME: A Replicated Image Detector for the World-Wide Web," Proceedings of the SPIE, vol. 3527, Nov. 2-4, 1998, pp. 58-67.

Chen et al., "Achievable Performance of Digital Watermarking Systems," IEEE, 1999, pp. 13-18.

Chen et al., "Quantization Index Modulation Methods for Digital Watermarking and Information Embedding of Multimedia," Journal of VLSI Signal Processing 27, 2001, pp. 7-33.

Kesal et al., "Iteratively Decodable Codes for Watermarking Applications," Proceedings of the Second Symposium on Turbo Codes and Their Applications, France, Sep. 2000, 4 pages.

Mihcak et al., "Blind Image Watermarking Via Derivation and Quantization of Robust Semi-Global Statistics," Proceedings of IEEE-ICASSP, Orlando FL, 2002, 4 pages.

Mihcak et al., "Cryptanalysis of Discrete-Sequence Spread Spectrum Watermarks," Proceedings of the Information Hiding Workshop, Holland 2002, 21 pages.

Mihcak et al., "New Iterative Geometric Methods for Robust Perceptual Image ashing," Proceedings of the Security and Privacy Digital Rights Management Workshop, 2001, 9 pages.

Mihcak et al., "Watermarking via Optimization Algorithms for Quantizing Randomized Statistics of Image Regions," Proceedings of the Annual Allerton Conference on Communication Control and Computing, Urbana IL, 2002, 10 pages.

Moulin et al., "The Parallel-Gaussian Watermarking Game," IEEE Transactions Information Theory, Feb. 2004, pp. 1-36.

Venkatesan et al., "Image Watermarking with Better Resilience," Proceedings of IEEE-ICIP, Vancouver BC Canada, 2000, 4 pages.

Venkatesan et al., "Robust Image Hashing," Proceedings of the IEEE-ICIP, Vancouver BC Canada, 2000, 3 pages.

Echizen et al., "General Quality Maintenance Module for Motion Picture Watermarking," IEEE Trans. on Consumer Electronics, vol. 45 No. 4, Nov. 1999, pp. 1150-1158.

Fridrich et al., "Robust Hash Functions for Digital Watermarking," Proc. Int. Conf. on Information Technology: Coding and Computing, Mar. 2000, pp. 178-183.

Lee et al., "Adaptive Video Watermarking Using Motion Information," Proc SPIE, vol. 3971: Security and Watermarking of Multimedia Contents, II Jan. 2000, pp. 209-216.

Malvar, "A Modulated Complex Lapped Transform and its Applications to Audio Processing," IEEE ICASSP'99, Phoenix AZ, Mar. 1999, pp. 1-4.

Mihcak et al., "A Perceptual Audio Hashing Algorithm: A Tool For Robust Audio Identification and Information Hiding," Proceedings of the Information Hiding Workshop, 2001, 15 pages.

Moulin et al., "A Framework for Evaluating the Data-Hiding Capacity of Image Sources," IEEE Transactions on Image Processing, vol. 11 No. 9, Sep. 2002, pp. 1-14.

Wu et al., "Video Access Control Via Multi-level Data Hiding," Proc. IEEE Int. Conf. on Multimedia and expo, vol. I, Jul. /Aug. 2000, pp. 381-384.

B. Chen and G. W. Wornell, "Quantization Index Modulation: A class of Provably Good Methods for Digital Watermarking and Information Embedding," IEEE Trans. Inform. Theory, 1999 and 2000, pp. 1-54.

B. Chen and G. W. Wornell, "Dither modulation: a new approach to digital watermarking and information embedding," Proc. of SPIE: Security and Watermarking of Multimedia Contents, vol. 3657, pp. 342-353, 1999.

Echizen, Isao et al., "General Quality Maintenance Module for Motion Picture Watermarking", IEEE Transactions on Consumer Electronics, vol. 45, No. 4, Nov. 1999, 9 pages.

Takeuci, Kazuki et al., "Image ID Extraction by Content Analysis and its Applications", Nov. 24, 2000, 8 pages.

"The Singular Value Decomposition", at <<http://www2.imm.dtu.dk/~pch/Projekter/tsvd.html>>, Aug. 20, 1999, pp. 3.

* cited by examiner

DERIVATION AND QUANTIZATION OF ROBUST NON-LOCAL CHARACTERISTICS FOR BLIND WATERMARKING

RELATED APPLICATIONS

This application is a continuation of and claims priority to U.S. patent application Ser. No. 09/843,279, filed Apr. 24, 2001, now U.S. Pat. No. 7,020,775 the disclosure of which is incorporated by reference herein.

TECHNICAL FIELD

This invention generally relates to a watermarking technology.

BACKGROUND

"Digital goods" is a generic label for electronically stored or transmitted content. Examples of digital goods include images, audio clips, video, digital film, multimedia, software, and data. Digital goods may also be called a "digital signal," "content signal," "digital bitstream," "media signal," "digital object," "object," and the like.

Digital goods are often distributed to consumers over private and public networks—such as Intranets and the Internet. In addition, these goods are distributed to consumers via fixed computer readable media, such as a compact disc (CD-ROM), digital versatile disc (DVD), soft magnetic diskette, or hard magnetic disk (e.g., a preloaded hard drive).

Unfortunately, it is relatively easy for a person to pirate the pristine digital content of a digital good at the expense and harm of the content owners—which includes the content author, publisher, developer, distributor, etc. The content-based industries (e.g., entertainment, music, film, etc.) that produce and distribute content are plagued by lost revenues due to digital piracy.

Modern digital pirates effectively rob content owners of their lawful compensation. Unless technology provides a mechanism to protect the rights of content owners, the creative community and culture will be impoverished.

Watermarking

Watermarking is one of the most promising techniques for protecting the content owner's rights of a digital good (i.e., digital good). Generally, watermarking is a process of altering the digital good such that its perceptual characteristics are preserved. More specifically, a "watermark" is a pattern of bits inserted into a digital good that may be used to identify the content owners and/or the protected rights.

Watermarks are designed to be completely invisible or, more precisely, to be imperceptible to humans and statistical analysis tools. Ideally, a watermarked signal is perceptually identical to the original signal.

A watermark embedder (i.e., encoder) embeds a watermark into a digital good. It typically uses a secret key to embed the watermark. A watermark detector (i.e., decoder) extracts the watermark from the watermarked digital good.

Blind Watermarking

To detect the watermark, some watermarking techniques require access to the original unmarked digital good or to a pristine specimen of the marked digital good. Of course, these techniques are not desirable when the watermark detector is available publicly. If publicly available, then a malicious attacker may get access to the original unmarked digital good or to a pristine specimen of the marked digital good. Consequently, these types of techniques are not used for public detectors.

Alternatively, watermarking techniques are "blind." This means that they do not require access to the original unmarked digital good or to a pristine specimen of the marked digital good. Of course, these "blind" watermarking techniques are desirable when the watermark detector is publicly available.

Robustness

Before detection, a watermarked signal may undergo many possible changes by users and by the distribution environment. These changes may include unintentional modifications, such as noise and distortions. Moreover, the marked signal is often the subject of malicious attacks particularly aimed at disabling the detection of the watermark.

Ideally, a watermarking technique should embed detectible watermarks that resist modifications and attacks as long as they result in signals that are of perceptually the same quality. A watermarking technique that is resistant to modifications and attacks may be called "robust." Aspects of such techniques are called "robust" if they encourage such resistance.

Generally speaking, a watermarking system should be robust enough to handle unintentional noise introduction into the signal (such noise my be introduced by A/D and D/A conversions, compressions/decompressions, data corruption during transmission, etc.)

Furthermore, a watermarking system should be robust enough and stealthy enough to avoid purposeful and malicious detection, alternation, and/or deletion of the watermark. Such an attack may use a "shotgun" approach where no specific watermark is known or detected (but is assumed to exist) or may use "sharp-shooter" approach where the specific watermark is attacked.

This robustness problem has attracted considerable attention. In general, the existing robust watermark techniques fall into two categories: spread-spectrum and quantization index modulation (QIM).

With the spread spectrum-type techniques, the watermark indexes the modification to the host data. The host data is the data of the original, unmarked digital signal (i.e., host signal). With typical spread-spectrum watermarking, each bit (e.g., 0s and 1s) of the watermark is embedded into the signal by slightly changing (e.g., adding a pseudorandom sequence that consists of $+\Delta$ or $+\Delta$) the signal.

With quantization index modulation (QIM), the watermark is embedded via indexing the modified host data. The modified host data is the data of the marked digital signal (i.e., marked host signal). This is discussed in more detail below.

Those of ordinary skill in the art are familiar with conventional techniques and technology associated with watermarks, watermark embedding, and watermark detecting. In addition, those of ordinary skill in the art are familiar with the typical problems associated with proper watermark detection after a marked signal has undergone changes (e.g., unintentional noise and malicious attacks).

Desiderata of Watermarking Technology

Watermarking technology has several highly desirable goals (i.e., desiderata) to facilitate protection of copyrights of content publishers. Below are listed several of such goals.

Perceptual Invisibility. The embedded information should not induce perceptual changes in the signal quality of the resulting watermarked signal. The test of perceptual invisibility is often called the "golden eyes and ears" test.

Statistical Invisibility. The embedded information should be quantitatively imperceptive for any exhaustive, heuristic, or probabilistic attempt to detect or remove the watermark. The complexity of successfully launching such attacks should be well beyond the computation power of publicly available computer systems. Herein, statistical invisibility is expressly included within perceptual invisibility.

Tamperproofness. An attempt to remove the watermark should damage the value of the digital good well above the hearing threshold.

Cost. The system should be inexpensive to license and implement on both programmable and application-specific platforms.

Non-disclosure of the Original. The watermarking and detection protocols should be such that the process of proving digital good content copyright both in-situ and in-court, does not involve usage of the original recording.

Enforceability and Flexibility. The watermarking technique should provide strong and undeniable copyright proof. Similarly, it should enable a spectrum of protection levels, which correspond to variable digital good presentation and compression standards.

Resilience to Common Attacks. Public availability of powerful digital good editing tools imposes that the watermarking and detection process is resilient to attacks spawned from such consoles.

False Alarms & Misses

When developing a watermarking technique, one does not want to increase the probability of a false alarm. That is when a watermark is detected, but none exists. This is something like finding evidence of a crime that did not happen. Someone may be falsely accused of wrongdoing.

As the probability of false alarms increases, the confidence in the watermarking technique decreases. For example, people often ignore car alarms because they know that more often than not it is a false alarm rather than an actual car theft.

Likewise, one does not want to increase the probability of a miss. This is when the watermark of a signal is not properly detected. This is something like overlooking key piece of evidence at a crime scene. Because of this, a wrongdoing may never be properly investigated. As the probability of misses increases, the confidence in the watermarking technique decreases.

Ideally, the probabilities of a false alarm and a miss are zero. In reality, a compromise is often made between them. Typically, a decrease in the probability of one increases the probability of the other. For example, as the probability of false alarm is decreased, the probability of a miss increases.

Consequently, a watermarking technique is needed that minimizes both while finding a proper balance between them.

Quantization Index Modulation (QIM)

To that end, some have proposed embedding a watermark by indexing the signal (e.g., host data) during the watermark embedding. This technique is called quantization index modulation (QIM) and it was briefly introduced above.

In general, quantization means to limit the possible values of (a magnitude or quantity) to a discrete set of values. Quantization may be thought of as a conversion from non-discrete (e.g., analog or continuous) values to discrete values. Alternatively, it may be a conversion between discrete values with differing scales. Quantization may be accomplished mathematically through rounding or truncation. Typical QIM refers to embedding information by first modulating an index or sequence of indices with the embedded information and then quantizing the host signal with the associated quantizer or sequence of quantizers. A quantizer is class of discontinuous, approximate-identity functions.

The major proponent of such QIM techniques is Brian Chen and Gregory W. Wornell (i.e., Chen-Wornell). In their words, they have proposed, "dither modulation in which the embedded information modulates a dither signal and the host signal is quantized with an associated dither quantizer" (from Abstract of Chen-Wornell article from the *IEEE Trans. Inform. Theory*).

See the following documents for more details on Chen-Wornell's proposals and on QIM:

B. Chen and G. W. Wornell, "Digital watermarking and information embedding using dither modulation," *Proc. IEEE Workshop on Multimedia Signal Processing*, Redondo Beach, Calif., pp. 273-278, December 1998;

B. Chen and G. W. Wornell, "Dither modulation: a new approach to digital watermarking and information embedding," *Proc. of SPIE: Security and Watermarking of Multimedia Contents*, vol. 3657, pp. 342-353, 1999;

B. Chen and G. W. Wornell, "Quantization Index Modulation: A class of Provably Good Methods for Digital Watermarking and Information Embedding," *IEEE Trans. Inform. Theory*, 1999 and 2000.

Limitations of Conventional QIM

However, a key problem with conventional QIM is that it is susceptible to attacks and distortions. Conventional QIM relies upon local characteristics within relative to specific representation of a signal (e.g., in the time or frequency domain). To quantize, conventional QIM relies exclusively upon the values of "individual coefficients" of the representation of the signal. An example of such an "individual coefficients" is the color of an individual pixel of an image.

When quantizing, only the local characteristics of an "individual coefficient" are considered. These local characteristics may include value (e.g., color, amplitude) and relative positioning (e.g., positioning in time and/or frequency domains) of an individual bit (e.g., pixel).

Modifications—from either an attack or some type of unintentional noise—can change local characteristics of a signal quite dramatically. For example, these modifications may have a dramatic affect on the color of a pixel or the amplitude of a bit of sound. However, such modifications have little effect on non-local characteristics of a signal.

Accordingly, a new and robust watermarking technique is needed to find the proper balance between minimizing the probability of false alarms and the probability of misses, such as QIM watermarking techniques. However, such a technique is needed that is less susceptible to attacks and distortions to the local characteristics within a signal.

SUMMARY

Described herein is a technology for deriving robust non-local characteristics and quantizing such characteristics for blind watermarking of a digital good.

This summary itself is not intended to limit the scope of this patent. Moreover, the title of this patent is not intended to limit the scope of this patent. For a better understanding of the present invention, please see the following detailed description and appending claims, taken in conjunction with the accompanying drawings. The scope of the present invention is pointed out in the appending claims.

BRIEF DESCRIPTION OF THE DRAWINGS

The same numbers are used throughout the drawings to reference like elements and features.

DETAILED DESCRIPTION

In the following description, for purposes of explanation, specific numbers, materials and configurations are set forth in order to provide a thorough understanding of the present invention. However, it will be apparent to one skilled in the art that the present invention may be practiced without the specific exemplary details. In other instances, well-known features are omitted or simplified to clarify the description of the exemplary implementations of present invention, thereby better explain the present invention. Furthermore, for ease of understanding, certain method steps are delineated as separate steps; however, these separately delineated steps should not be construed as necessarily order dependent in their performance.

The following description sets forth one or more exemplary implementations of a Derivation and Quantization of Robust Non-Local Characteristics for Blind Watermarking that incorporate elements recited in the appended claims. These implementations are described with specificity in order to meet statutory written description, enablement, and best-mode requirements. However, the description itself is not intended to limit the scope of this patent.

The inventors intend these exemplary implementations to be examples. The inventors do not intend these exemplary implementations to limit the scope of the claimed present invention. Rather, the inventors have contemplated that the claimed present invention might also be embodied and implemented in other ways, in conjunction with other present or future technologies.

An example of an embodiment of a Derivation and Quantization of Robust Non-Local Characteristics for Blind Watermarking may be referred to as "exemplary non-local QIM watermarker."

Incorporation by Reference

The following co-pending patent applications are incorporated by reference herein (which are all assigned to the Microsoft Corporation):

U.S. patent application Ser. No. 09/390271, entitled "A Technique for Watermarking an Image and a Resulting Watermarked' Image" filed Sep. 7, 1999;

U.S. patent application Ser. No. 09/390272, entitled "A Technique for Detecting a Watermark in a Marked Image" filed on Sep. 7, 1999;

U.S. patent application Ser. No. 09/614,660, entitled "Improved Stealthy Audio Watermarking" filed on Jul. 12, 2000; and U.S. patent application Ser. No. 09/316,899, entitled "Audio Watermarking with Dual Watermarks" filed on May 22, 1999.

Introduction

Figure 6:
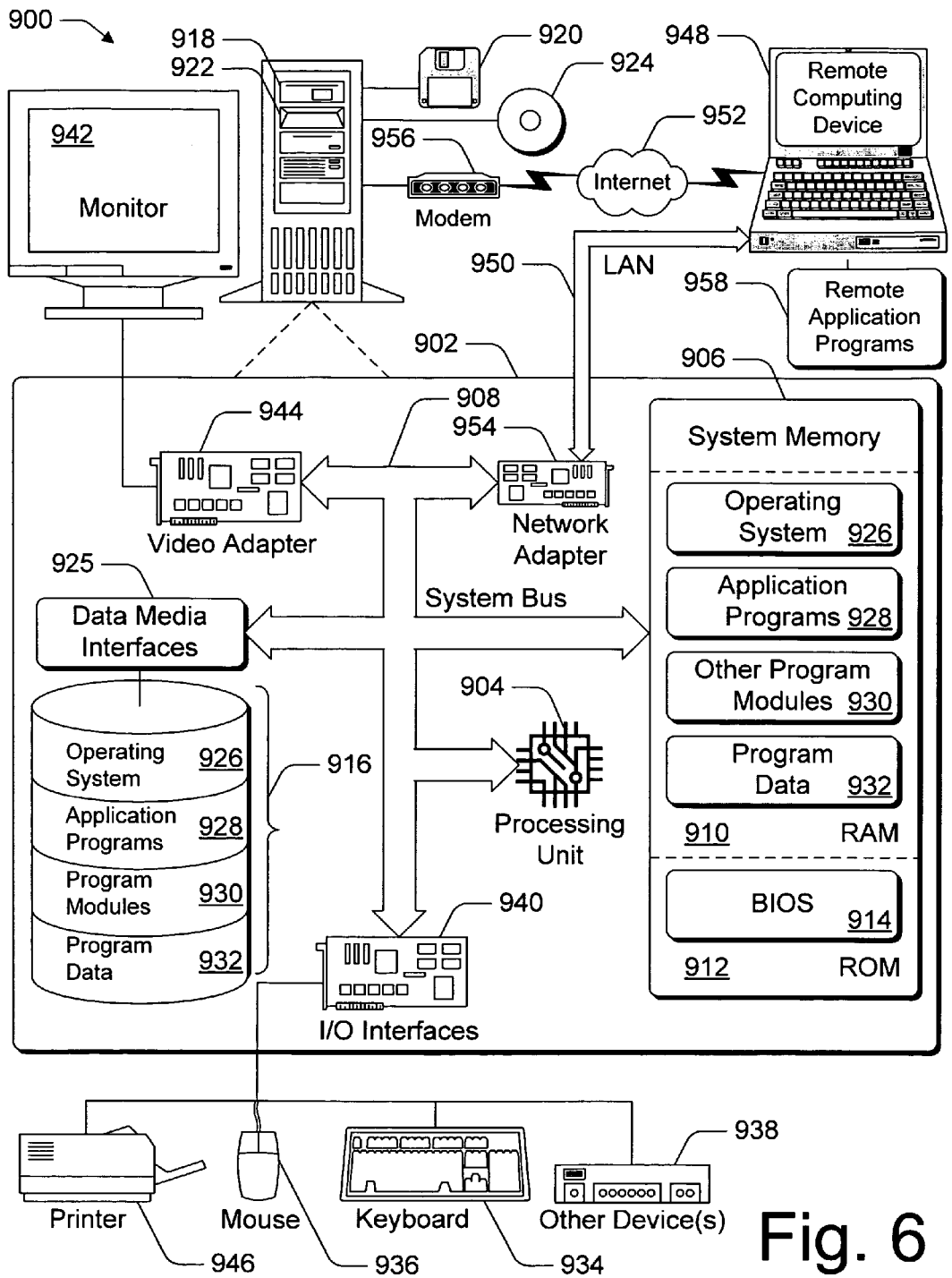
FIG. 6 is an example of a computing operating environment capable of implementing an implementation (wholly or partially) of the invention claimed herein.

The one or more exemplary implementations, described herein, of the present claimed invention may be implemented (in whole or in part) by a non-local QIM watermarking architecture 100 and/or by a computing environment like that shown in FIG. 6.

In general, the exemplary non-local QIM watermarker derives robust non-local characteristics of a digital good. It quantizes such characteristics for blind watermarking of the digital good.

The exemplary non-local QIM watermarker minimizes the probability of false alarms (i.e., detecting a non-existent watermark) and the probability of misses (i.e., failing to detect an existing watermark). It does so by employing quantization index modulation (QIM) watermarking. However, it does not employ conventional QIM techniques because they are susceptible to attacks and distortions to the local characteristics of a digital good.

Local Characteristics

Conventional QIM relies upon local characteristics within a signal (i.e., a digital good). To quantize, conventional QIM relies exclusively upon the values of "individual elements" of the host signal. When quantizing, only the local characteristics of an "individual element" are considered. These local characteristics may include value (e.g., color, amplitude) and relative positioning (e.g., positioning in time and/or frequency domains) of an individual bit (e.g., pixel).

Modifications—from either an attack or unintentional noise—can change local characteristics of a signal quite dramatically. For example, these modifications may have a dramatic affect on the color of a pixel or the amplitude of a bit of sound. However, such modifications have little effect on non-local characteristics of a signal.

Non-Local Characteristics

Non-local characteristics are representative of general characteristics of a group or collection of individual elements. Such a group may be called a segment. Non-local characteristics are not representative of the individual local characteristics of the individual elements; rather, they are representative of the group (e.g., segments) as a whole.

The non-local characteristics may be determined by a mathematical or statistical representation of a group. For example, it may be an average of the color values of all pixels in a group. Consequently, such non-local characteristics may also be called "statistical characteristics." Local characteristics do not have statistical characteristics because a fixed value for a given category. Thus, no statistics are derived from a single value.

The non-local characteristics are not local characteristics. They are not global characteristics. Rather, they are in between. Consequently, they may also be called "semi-global" characteristics.

Brief Overview

Given an original, unmarked good, the exemplary non-local QIM watermarker derives robust characteristics that are not local in nature. For example, the exemplary non-local QIM watermarker may employ randomized non-invertible transforms to produce robust non-local characteristics that can be modified without perceptual distortion. These characteristics are typically represented statistically and/or mathematically.

To embed the watermark, the exemplary non-local QIM watermarker performs quantization of these non-local characteristics in one or more dimensional lattices or vector spaces. The marked good that results from the exemplary non-local QIM watermarker is robust against unintentional and intentional modifications (e.g., malicious attacks). Examples of malicious attacks include de-synching, random bending, and many other benchmark attacks (e.g., Stirmark attacks).

Exemplary Non-Local QIM Watermarking Architecture

Figure 1:
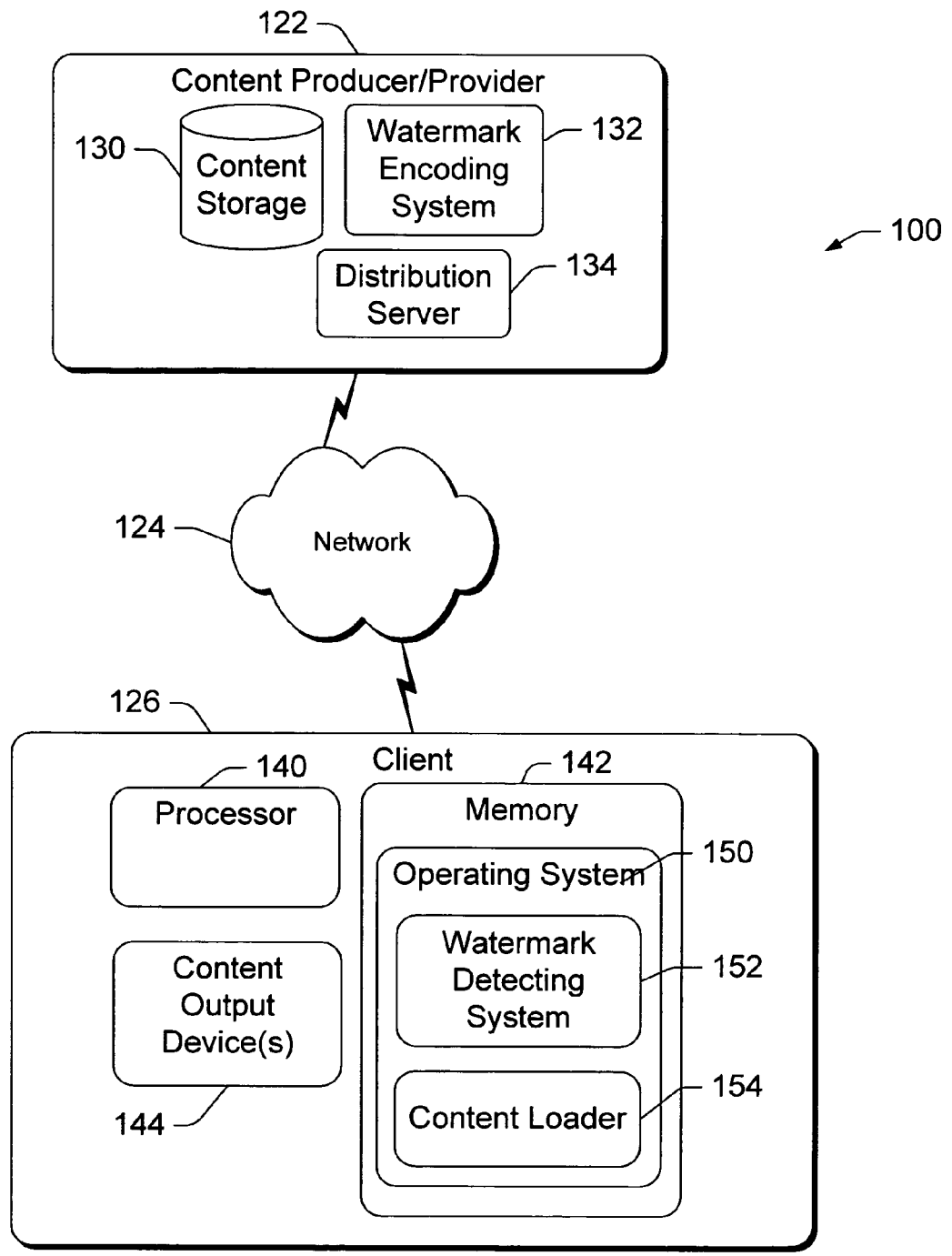
FIG. 1 is a schematic block diagram showing a watermarking architecture in accordance with an implementation of the invention claimed herein.

FIG. 1 shows a digital goods production and distribution architecture 100 (i.e., non-local QIM watermarking architecture 100) having a content producer/provider 122 that produces original content and distributes the content over a network 124 to a client 126. The content producer/provider 122 has a content storage 130 to store digital goods containing original content. The content producer 122 has a watermark embedding system 132 to sign the digital signals with a watermark that uniquely identifies the content as original. The watermark embedding system 132 may be implemented as a standalone process or incorporated into other applications or an operating system.

The watermark embedding system 132 applies the watermark to a digital signal from the content storage 130. Typically, the watermark identifies the content producer 122, providing a signature that is embedded in the signal and cannot be cleanly removed.

The content producer/provider 122 has a distribution server 134 that distributes the watermarked content over the network 124 (e.g., the Internet). A signal with a watermark embedded therein represents to a recipient that the signal is being distributed in accordance with the copyright authority of the content producer/provider 122. The server 134 may further compress and/or encrypt the content conventional compression and encryption techniques prior to distributing the content over the network 124.

Typically, the client 126 is equipped with a processor 140, a memory 142, and one or more content output devices 144 (e.g., display, sound card, speakers, etc.). The processor 140 runs various tools to process the marked signal, such as tools to decompress the signal, decrypt the date, filter the content, and/or apply signal controls (tone, volume, etc.). The memory 142 stores an operating system 150 (such as a Microsoft® Windows 2000® operating system), which executes on the processor. The client 126 may be embodied in many different ways, including a computer, a handheld entertainment device, a set-top box, a television, an appliance, and so forth.

The operating system 150 implements a client-side watermark detecting system 152 to detect watermarks in the digital signal and a content loader 154 (e.g., multimedia player, audio player) to facilitate the use of content through the content output device(s) 144. If the watermark is present, the client can identify its copyright and other associated information.

The operating system 150 and/or processor 140 may be configured to enforce certain rules imposed by the content producer/provider (or copyright owner). For instance, the operating system and/or processor may be configured to reject fake or copied content that does not possess a valid watermark. In another example, the system could load unverified content with a reduced level of fidelity.

Exemplary Non-Local QIM Watermark Embedding System

Figure 2:
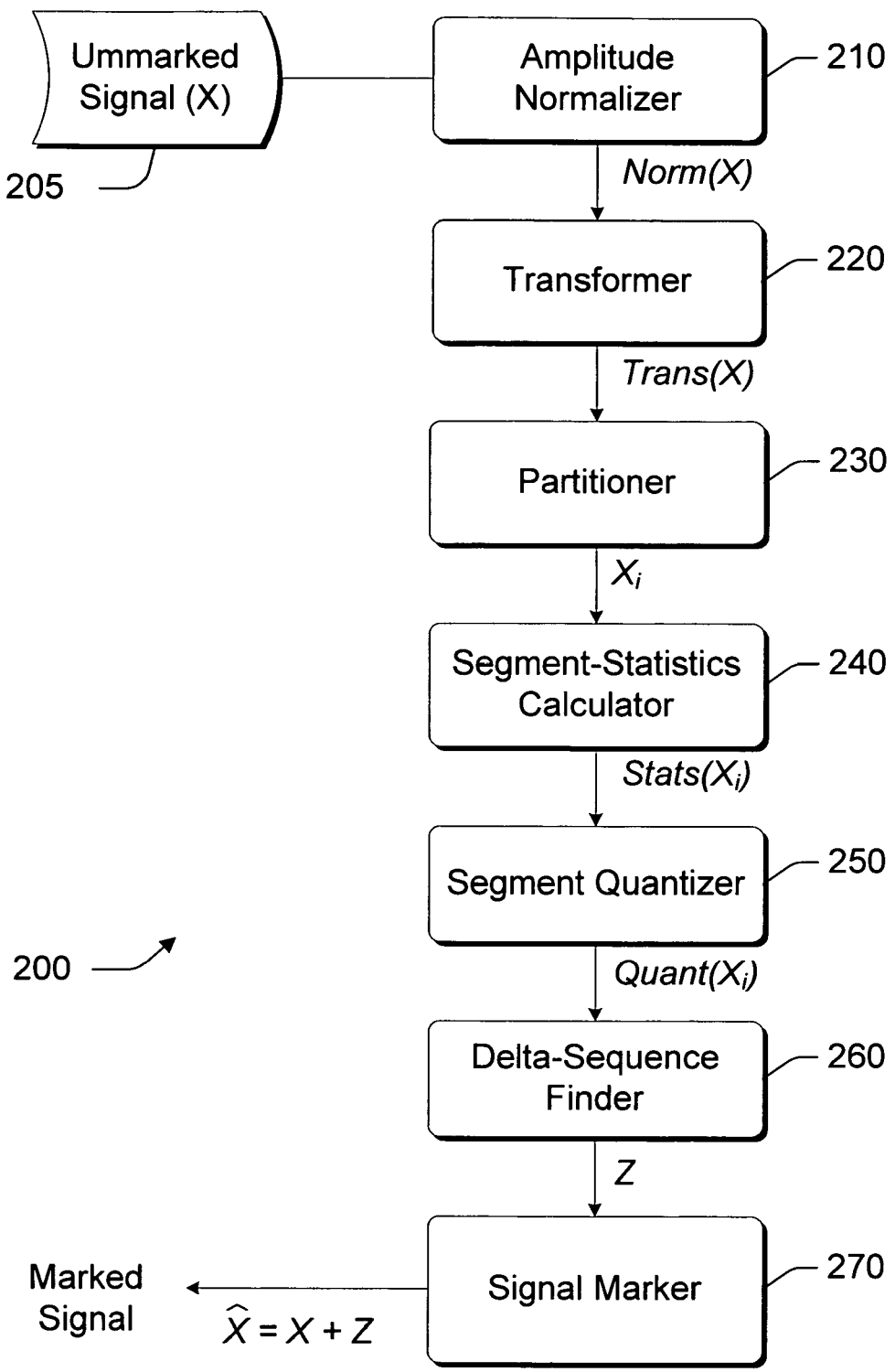
FIG. 2 is a schematic block diagram showing an embodiment (e.g., a watermark embedding system) of the invention claimed herein.

FIG. 2 shows an exemplary non-local QIM watermark embedding system 200, which is an example of an embodiment of a portion of the non-local QIM watermarking architecture 100. This system may be employed as the watermark encoding system 132 of FIG. 1.

The watermark embedding system 200 includes an amplitude normalizer 210, a transformer 220, a partitioner 230, segment-statistics calculator 240, a segment quantizer 250, a delta-sequence finder 260, and a signal marker 270.

The amplitude normalizer 210 obtains a digital signal 205 (such as an audio clip). It may obtain the signal from nearly any source, such as a storage device or over a network communications link. As its name implies, it normalizes the amplitude of the signal.

The transformer 220 receives the amplitude-normalized signal from the normalizer 210. The transformer 220 puts the signal in canonical form using a set of transformations. Specifically, discrete wavelet transformation (DWT) may be employed (particularly, when the input is an image) since it compactly captures significant signal characteristics via time and frequency localization. Other transformations may be used. For instance, shift-invariant and shape-preserving "complex wavelets" and any overcomplete wavelet representation or wavelet packet are good candidates (particularly for images).

The transformer 220 also finds the DC subband of the initial transformation of the signal. This DC subband of the transformed signal is passed to the partitioner 230.

The partitioner 230 separates the transformed signal into multiple, pseudorandomly sized, pseudorandomly positioned, adjacent, non-contiguous segments (i.e., partitions). A secret key K is the seed for pseudorandom number generation here. This same K may be used to reconstruct the segments by an exemplary non-local QIM watermark detecting system 400.

For example, if the signal is an image, it might be partitioned into two-dimensional polygons (e.g., rectangles) of pseudorandom size and location. In another example, if the signal is an audio clip, a two-dimensional representation (using frequency and time) of the audio clip might be separated into two-dimensional polygons (e.g., triangles) of pseudorandom size and location.

In this implementation, the segments do not overlap. They are adjacent and non-contiguous. In alternative implementations, the segments may be overlapping.

For each segment, the segment-statistics calculator 240 calculates statistics of the multiple segments generated by the partitioner 230. Statistics for each segment are calculated. These statistics may be, for example, any finite order moments of a segment. Examples of such include the mean, the median, and the standard deviation.

Generally, the statistics calculations for each segment are independent of the calculations of other segments. However, other alternatives may involve calculations dependent on data from multiple segments.

A suitable statistic for such calculation is the mean (e.g., average) of the values of the individual bits of the segment. Other suitable statistics and their robustness are discussed in Venkatesan, Koon, Jakubowski, and Moulin, "Robust image hashing," *Proc. IEEE ICIP* 2000, Vancouver, Canada, September 2000. In this document, no information embedding was considered, but similar statistics were discussed.

For each segment, the segment quantizer 250 applies a multi-level (e.g., 2, 3, 4) quantization (i.e., high-dimensional, vector-dimensional, or lattice-dimensional quantization) on the output of the segment-statistics calculator 240 to obtain quantitized data. Of course, other levels of quantization may be employed. The quantizer 250 may be adaptive or non-adaptive.

This quantization may be done randomly also. This may be called randomized quantization (or randomized rounding). This means that the quantizer may randomly decide to round up or round down. It may do it pseudorandomly (using the secret key). This adds an additional degree of robustness and helps hide the watermark.

The delta-sequence finder 260 finds a pseudorandom sequence Z that estimates the difference (i.e., delta) between the original transformed signal X and the combination of segments of quantized statistics. The pseudorandom sequence Z may also be called the delta-sequence. For example, if the statistic is averaging, then Z s.t. $Avg_i(X+Z) = Avg_i(\hat{X}) = \hat{\mu}_i$, where $\hat{X}$ is the marked signal and $\hat{\mu}_i$ is average for a segment.

When finding a delta-sequence Z, it is desirable to minimize the perceptual distortion; therefore, some perceptual distortion metrics may be employed to create this sequence. Thus, in creating Z for, the criteria may include a combination of that minimizes the visual distortions on X+Z (compared to $\hat{X}$) and minimizes the distance between the statistics of X+Z and quantized statistics of X.

The signal marker 270 marks the signal with delta-sequence Z so that $\hat{X}=X+Z$. The signal marker may mark the signal using QIM techniques. This marked signal may be publicly distributed to consumers and clients.

The functions of aforementioned components of the exemplary non-local QIM watermark embedding system 200 of FIG. 2 are explained in more detail below.

Figure 3:
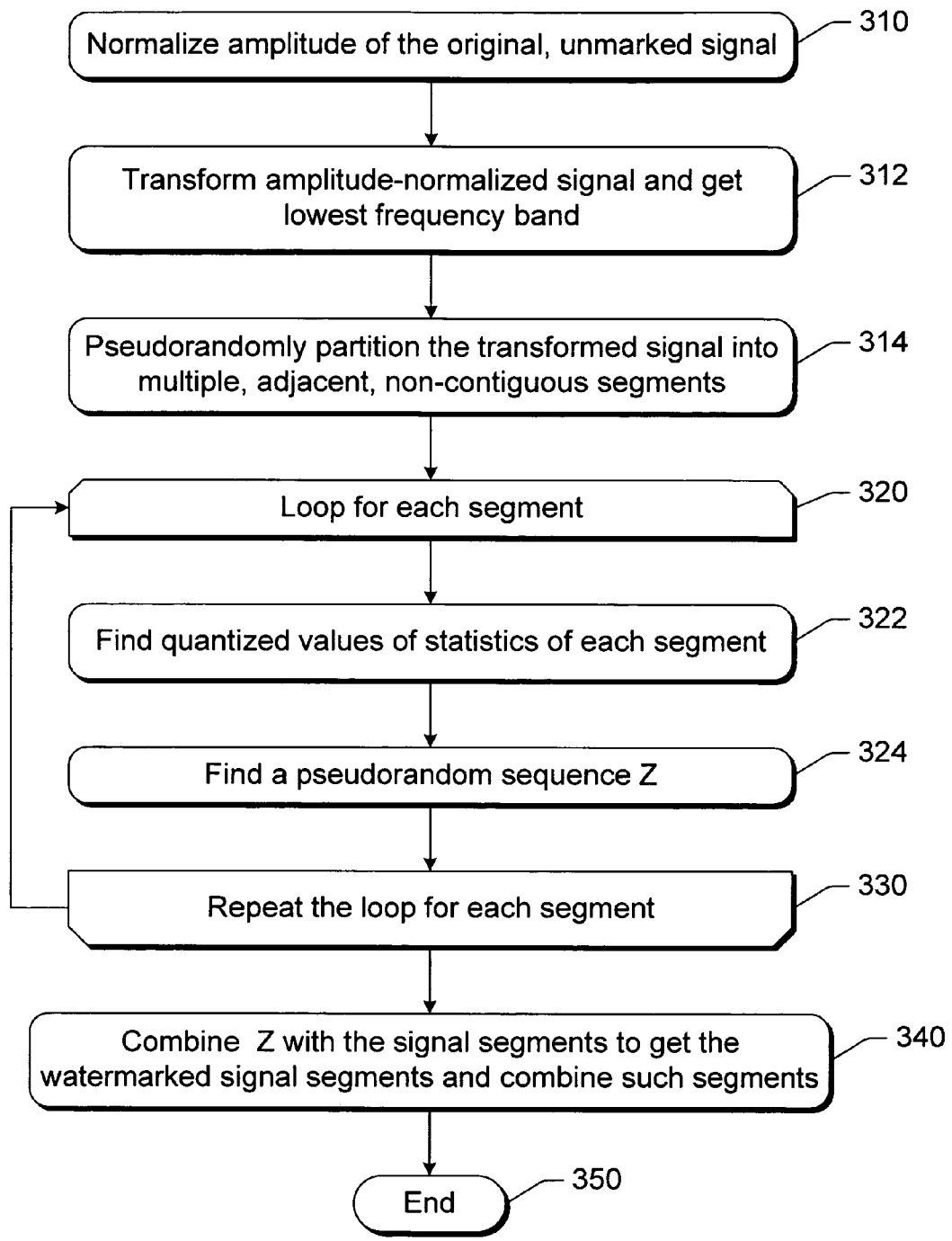
FIG. 3 is a flow diagram showing an illustrative methodological implementation (e.g., watermark embedding) of the invention claimed herein.

Methodological Implementation of the Exemplary Non-Local QIM Watermark Embedding FIG. 3 shows the methodological implementation of the exemplary non-local QIM watermark embedding system 200 (or some portion thereof). More specifically, this figure shows the methodological implementation of watermark embedding of the exemplary non-local QIM watermarker. This methodological implementation may be performed in software, hardware, or a combination thereof.

At 310 of FIG. 3, the exemplary non-local QIM watermarker normalizes the amplitude of the input. The input is the original, unmarked signal (i.e., digital good). At 312, it finds a transform of the amplitude-normalized signal and gets the lowest frequency band (e.g., the DC subband). The result of this block is a transformed signal. This transformation is a discrete wavelet transformation (DWT), but most any other similar transformation may be performed in alternative implementations.

At 314, the exemplary non-local QIM watermarker partitions the transformed signal into multiple, pseudorandomly sized, pseudorandomly positioned, adjacent, non-contiguous segments. A secret key K is the seed for pseudorandom number generation here. This same K may be used to reconstruct the segments in the watermark detecting process.

For example, if the signal is an image, it might be separated into two-dimensional polygons (e.g., rectangles) of pseudorandom size and location. In another example, if the signal is an audio clip, a two-dimensional representation (using frequency and time) of the audio clip might be separated into two-dimensional polygons (e.g., trapezoids) of pseudorandom size and location.

In this implementation, the segments do not overlap. They are adjacent and non-contiguous. In alternative implementations, the segments may be overlapping.

For each segment of the signal, the exemplary non-local QIM watermarker repeats blocks 320 through 330. Thus, each segment is processed in the same manner.

At 322 of FIG. 3, the exemplary non-local QIM watermarker has a watermark (or a portion thereof) to embed in the current segment. It finds quantized values of statistics of the segment (e.g., averages within the segment or as close as possible). At this point, scalar uniform quantizer and reconstruction points may be randomly perturbed with K as the seed.

At 324, the exemplary non-local QIM watermarker finds a pseudorandom sequence Z where the statistics calculation (e.g., averaging) of this sequence combined with the segmented signal generates the calculation of watermarked signal segment. This is also equal to the quanitized statistics of the signal segment.

At 330, the process loops back to 320 for each unprocessed segment. If all segments have been processed, then it proceeds to 340.

At 340 of FIG. 3, the exemplary non-local QIM watermarker combines the pseudorandom sequence with the signal segments to get the watermarked signal segments. In addition, the watermarked signal segments are combined to form a full watermarked signal. In other words, $\hat{X}=X+Z$. At 350, the process ends.

Exemplary Non-Local QIM Watermark Detecting System

Figure 4:
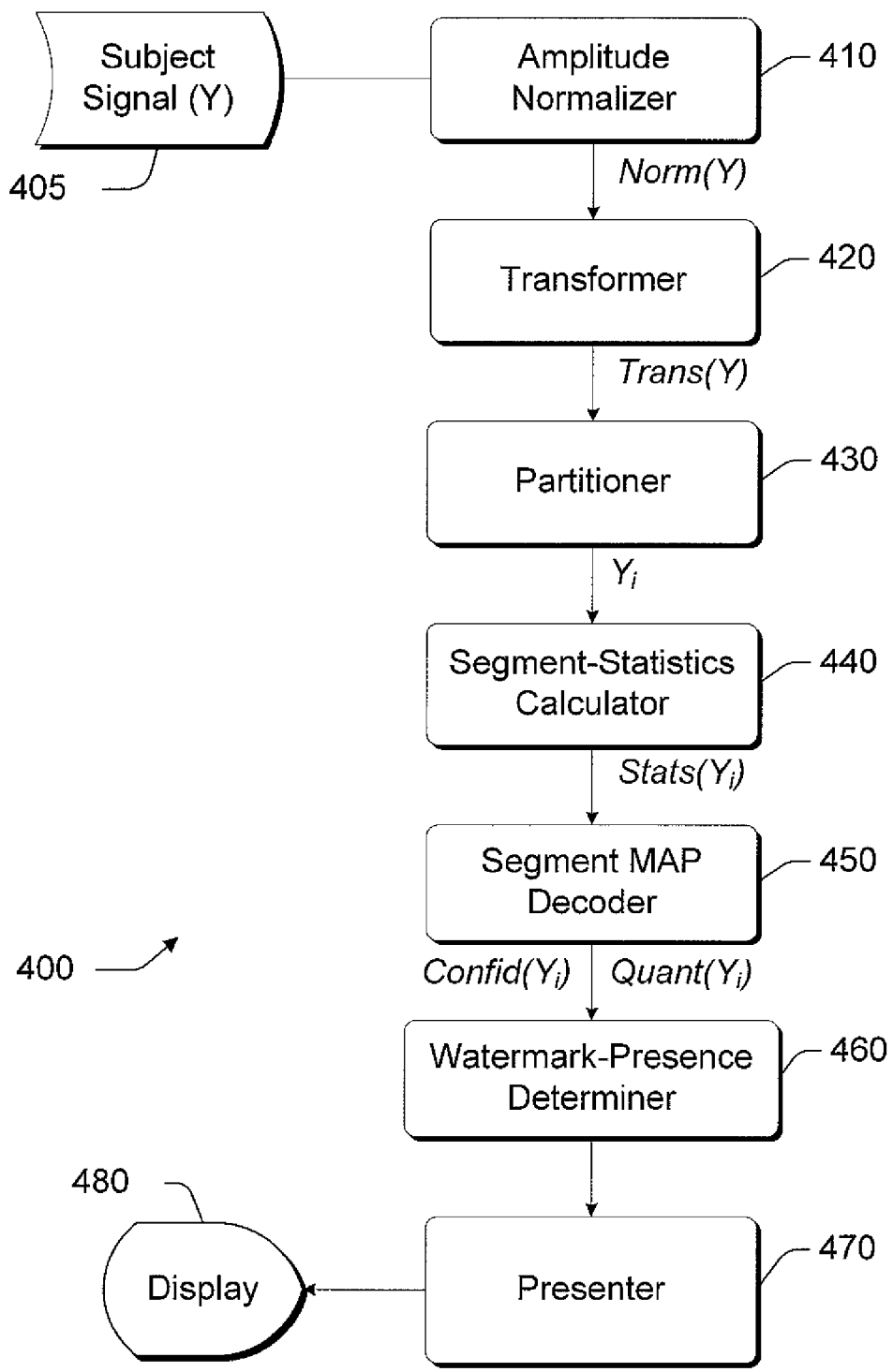
FIG. 4 is a schematic block diagram showing an embodiment (e.g., a watermark detecting system) of the invention claimed herein.

FIG. 4 shows an exemplary non-local QIM watermark detecting system 400, which is an example of an embodiment of a portion of the non-local QIM watermarking architecture 100. This system may be employed as the watermark detecting system 152 of FIG. 1.

The watermark detecting system 400 includes an amplitude normalizer 410, a transformer 420, a partitioner 430, segment-statistics calculator 440, a segment MAP decoder 450, a watermark-presence determiner 460, a presenter 470, and a display 480.

The amplitude normalizer 410, the transformer 420, the partitioner 430, and the segment-statistics calculator 440 of the watermark detecting system 400 of FIG. 4 function in a similar manner as similarly labeled components of the watermark embedding system 200 of FIG. 2. The exception is that the object of these components is a "subject signal" 405 rather than the original signal 205. A "subject signal" 405 is an unknown. It may or may not include a watermark. It may have been modified.

For each segment, the segment MAP decoder 450 determines a quantized value using the MAP decoding scheme. In general, MAP techniques involve finding (and possibly ranking by distance) all objects (in this instance, quantized values) in terms of their distance from a "point." In this example, the "point" is the statistics calculated for a given segment. Nearest-neighbor decoding is one specific instance of MAP decoding. Those of ordinary skill in the art understand and appreciate MAP and nearest-neighbor techniques.

In addition, the segment MAP decoder 450 determines a confidence factor based upon the distance between the quanitized values and the statistics calculated for a given segment. If they are coexistent, then factor will indicate a high degree of confidence. If they are distant, then it may indicate a low degree of confidence. Furthermore, the decoder 450 combines the confidence factors of the segments to get an overall confidence factor. That combination may be most any statistical combination (e.g., addition, average, median, standard deviation, etc.).

The watermark-presence determiner 460 determines whether a watermark is present. The determiner may use some distortion metric d(w,ŵ) and some threshold T to decide if watermark is present or not. A normalized Hamming distance may be used.

The presenter 470 presents one of three indications: "watermark present," "watermark not present," and "unknown." If the confidence factor is low, it may indicate "unknown." In addition, it may present the confidence-indication value.

This information is presented on the display 480. Of course, this display may be any output device. It may also be a storage device.

The functions of aforementioned components of the exemplary non-local QIM watermark detecting system 400 of FIG. 4 are explained in more detail below.

Figure 5:
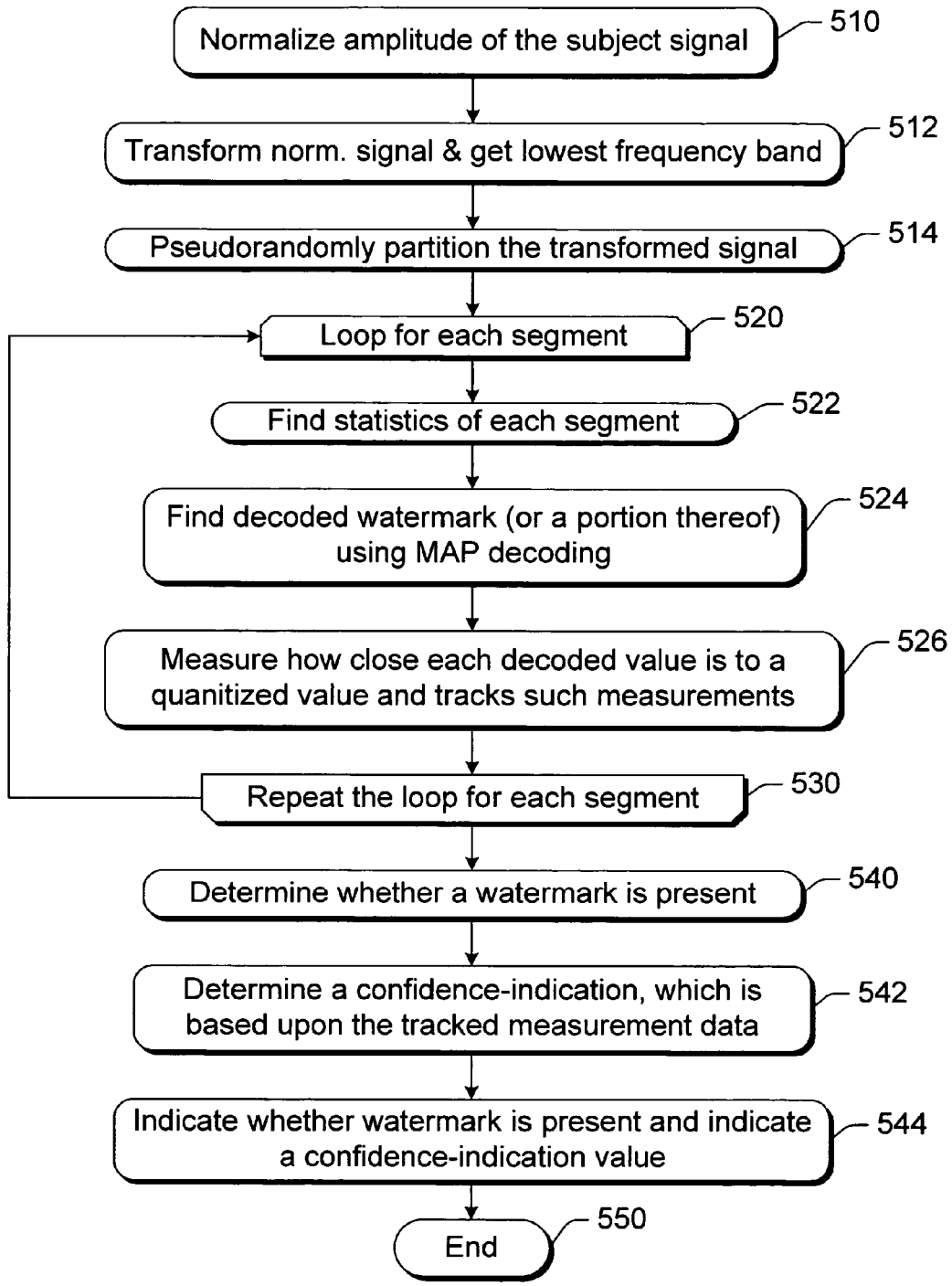
FIG. 5 is a flow diagram showing an illustrative methodological implementation (e.g., watermark detecting) of the invention claimed herein.

Methodological Implementation of the Exemplary Non-Local QIM Watermark Detecting FIG. 5 shows the methodological implementation of the exemplary non-local QIM watermark detecting system 400 (or some portion thereof). More specifically, this figure shows the methodological implementation of watermark detecting of the exemplary non-local QIM watermarker. This methodological implementation may be performed in software, hardware, or a combination thereof.

At 510 of FIG. 5, the exemplary non-local QIM watermarker normalizes the amplitude of the input. The input is an unknown specimen (i.e., signal) of a digital good. It is not known whether this signal includes a watermark or not.

At 512, it finds a transform of the amplitude-normalized signal and gets significant frequency subband. That may be a low or the lowest subband (e.g., the DC subband). Generally, the subband selected may be one that represents the signal is a manner that helps further robust watermarking and detection of the watermark. The lower frequency subbands are suitable because they tend to remain relatively invariant after signal perturbation.

The result of this block is a transformed signal. When watermarking an image, an example of a suitable transformation is discrete wavelet transformation (DWT). When watermarking an audio clip, an example of a suitable transformation is MCLT (Modulated Complex Lapped Transform). However, most any other similar transformation may be performed in alternative implementations.

At 514, the exemplary non-local QIM watermarker partitions the transformed signal into multiple, pseudorandomly sized, pseudorandomly positioned, adjacent, non-contiguous segments. It uses the same secret key K is the seed for its pseudorandom number generation here. Therefore, this process generates the same segments as in the embedding process.

For each segment of the signal, the exemplary non-local QIM watermarker repeats blocks 520 through 530. Thus, each segment is processed in the same manner.

At 522 of FIG. 5, the exemplary non-local QIM watermarker finds statistics of the segment (e.g., averages within the segment). At 524, the exemplary non-local QIM watermarker finds decoded watermark (or a portion thereof) using Maximum A Posteriori (MAP) decoding. An example of such a MAP decoding is nearest-neighbor decoding.

At 526, it measures how close each decoded value is to a quanitized value and tracks such measurements. The data provided by such measurements may provide an indication of the confidence of a resulting watermark-presence determination.

At 530, the process loops back to 520 for each unprocessed segment. If all segments have been processed, then it proceeds to 540.

At 540 of FIG. 5, the exemplary non-local QIM watermarker determines whether a watermark is present. At 542, it determines a confidence-indication, which is based upon the tracked measurement data.

At 544, based upon the watermark-presence determination of block 540 and the confidence-indication of block 544, the exemplary non-local QIM watermarker provides one of three indications: watermark present, watermark not present, and unknown. In addition, it may present the confidence-indication value.

At 550, the process ends.

Probability of False Alarms and Misses

There is a relationship between Probability of false alarm ($P_F$), Probability of miss ($P_M$), and the average sizes of the segments. $P_F$ is the probability of declaring that a watermark is present even though it is not. $P_M$ is the probability declaring that a watermark is not present although it is present indeed. Generally, the average segment size is relatively directly proportional to the $P_F$, but it is relatively indirectly proportional to the $P_M$.

For example, if the average segment-size is extremely small. So small that they are equivalent to the individual bits (e.g., equal to a pixel in an image. In that situation, watermarks are embedded in single coefficients, which is equivalent to the conventional schemes based on local characteristics. For such a case, $P_F$ is very small and $P_M$ is high. Conversely, if the average segment-size is extremely large. So large that it is the maximum size of the signal (e.g., the whole image). In that situation, $P_M$ is presumably very low whereas $P_F$ is high.

Other Implementation Details

For the following descriptions of an implementation of the exemplary non-local QIM watermarker, assume the following:

The input signal $\underline{X}$ is an image. Of course, for signal may be other types for other implementations. However, for this example implementation, the signal is an image. Let $\underline{w}$ be the watermark (a binary vector) to be embedded in $\underline{X}$ and a random binary string $\underline{K}$ be the secret key. The output of a watermark encoder, $\hat{\underline{X}}$ is the watermarked image in which the information $\underline{w}$ is hidden via the secret key K. This image will possibly undergo various attacks, yielding $\tilde{\underline{X}}$. A watermark decoder, given $\tilde{\underline{X}}$ and the secret key K outputs $\hat{\underline{w}}$. It is required that $\underline{X}$ and $\tilde{\underline{X}}$ are approximately the same for all practical purposes and that $\tilde{\underline{X}}$ is still of acceptable quality. The decoder uses some distortion metric d($\underline{w},\hat{\underline{w}}$) and some threshold T to decide if watermark is present or not. The exemplary non-local QIM watermarker use a normalized Hamming distance, which is the ratio of the usual Hamming distance and the length of the inputs.

WM Via Quantization

The exemplary non-local QIM watermarker computes a vector $\underline{\mu}$ by applying a forward transformation $T_F$ on $\underline{X}$. The exemplary non-local QIM watermarker assumes that $\underline{X}$ is a grayscale image; if not, a linear transformation may be applied on a colored image to obtain the intensity image. (For colored images, most of the energy is concentrated in the intensity plane). Once the information hiding process is done via quantization, there is $\hat{\underline{\mu}}$, and the watermarked data $\hat{X}$ are obtained by applying the transform $T_R$ on $\hat{\mu}$. The exemplary non-local QIM watermarker randomizes the process using a random string derived from our secret key K as a seed to a pseudo-random generator.

The scheme is generic. So most any transform may be used. In addition, $T_F=(T_R)^{-1}$ need not be true, or even that their inverses exist. The exemplary non-local QIM watermarker does not constrain the space where quantization occurs. The decoder applys the transform $T_F$ on the input, $\underline{Y}$, to get the output is $\mu$ is Y and applying approximate Maximum Likelihood (ML) estimation of the possibly embedded sequence $\hat{w}$ is Y. Through a pseudo-random generator, K will determine many randomization functions of the transform, quantization and estimation stages. Once $\hat{w}$ is Y is found, it is compared with the embedded watermark $\underline{w}$, if the distance between them is close to 0 (or less than a threshold T), then it is declared that the watermark is present; otherwise not present. This contrasts with the natural measure for spread spectrum techniques that yields a high value of correlation if the watermark is present.

More Details of this Methodological Implementation

The transforms $T_F$ and $T_R$ help enhance robustness. For $T_F$ to retain significant image characteristics, we may use discrete wavelet transformation (DWT) at the initial stage. Next, semi-global (i.e., non-local) statistics of segments are determined of the image. The local statistics are not robust.

When the exemplary non-local QIM watermarker computes, for example, the first order statistics of an original image signal and computes several attacked versions for random rectangles of fixed size. Then the average mean squared error between these statistics may be found. The error monotonically decays as the size of the rectangles is increased.

In $T_F$, $\mu$ is set to be the estimated first order statistics of randomly chosen rectangles in the wavelet domain. Here $T_F$ is not invertible if the number of rectangles is less than the number of coefficients. To choose $T_R$, one might first generate a pseudo-random sequence $\underline{\rho}$ in the image domain that has the property to be visually approximately unnoticeable, pass it through $T_F$, find the corresponding statistics $\mu_\rho$, compute the necessary scaling factors $\underline{\alpha}$ such that the pseudorandom sequence $\underline{\rho}$ scaled by $\underline{\alpha}$ and added to $\underline{X}$ yields the averages $\hat{\mu}$ that is quantized $\mu$. This implementation uses randomly chosen non-overlapping rectangles. The exemplary non-local QIM watermarker defines two quantizers, $Q_0$ and $Q_1$, which map vectors in $\mathbb{R}^n$ to some nearby chosen lattice points.

Here is a formal description. Define $Q_i:=\{(q_{ij}, \mathbf{S}_{ij})|j\in\mathbf{Z}\}$; $q_{ij}\in\mathbb{R}^n$ to be reconstruction points for $Q_i$; $\mathbf{S}_{ij} \subset$ are the corresponding quantization bins; $i\in\{0,156\}$ $j\in\mathbf{Z}$. For each j, then $\mathbf{S}_{0j}\cap[(\cup_{k\neq j}\mathbf{S}_{0k})\cup(\cup_k\mathbf{S}^{1k)}]=\mathbf{S}_{1j}\cap[(\cup^k_{\neq j}\mathbf{S}_{1k})\cup(\cup_k\mathbf{S}_{0k})]$ $=\emptyset$. Here $q_{0j}, q_{1j}$ are determined in a pseudo-random fashion (using K as the seed of the random number generator) and n is the dimension of quantization. The exemplary non-local QIM watermarker defines $Q_0[\alpha]=q_{0j}\Leftrightarrow\alpha\in\mathbf{S}_{0j}$, and likewise for $Q_1$. Both $Q_0$ and $Q_1$ are derived from a single quantizer, Q, such that ($\alpha$) the set of reconstruction points of Q is equal to $\{q_{0j}\}_j\cup\{q_{1j}\}_j$ and (b) for all j,k, $\min_{l\in\mathbf{Z}}d_{L2}[E(q_{0j}), E(q_{1k})]$ $=\min_{l\neq j}d_{L2}[E(q_{0j}), E(q_{1k})]$. Let $\xi$ denote the common value (c) for each fixed k, $\phi_k:=\min_{j\neq k}d_{L2}[E(q_{0j}), E(q_{0k})]=\min_{j\neq k}d_{L2}[E(q_{1j}), E(q_{1k})]$ and $\phi_i=\phi_j=\xi$ for all i,j. Here $d_{L2}$ is the $L_2$ distortion metric, and $E(\cdot)$ is the expectation operator over the pseudo-random choices $q_{ij}$.

If, for example, n=1. The exemplary non-local QIM watermarker finds $\{E(q_{0j})\}$ and $\{E(q_{1j})\}$ meeting the requirements mentioned above. Then randomization regions that are neighborhoods in $\mathbb{R}^n$ around $\{E(q_{0j})\}$ and $\{E(q_{1j})\}$ are introduced. Then $\{q^{0j}\}$ and $\{q_{1j}\}$ are randomly choosen from these regions using some suitable probability distributions. The sizes of the randomizing regions and their shapes are input parameters. Let nR be the number of rectangles each indexed suitably. Let R be the length of the binary watermark vector $\underline{w}$ to be hidden in rectangles. For a vector, $\underline{u}$ denotes its i-th entry by $\underline{u}(i)$. Let L denote the number of levels of DWT that is applied.

Encoding

Let N be the number of pixels in $\underline{X}$ and $\underline{s}:=[s_1, \ldots, s_N]$ be the vector that consists of pixels of $\underline{X}$ sorted in ascending order. Create subvectors $\underline{s}_L:=[s_t, \ldots, s_{t'}]$ where t:=round(N $(1-\beta)\gamma$) and t'=round(N$(1+\beta)\gamma$) and $\underline{s}_H:=[s_u, s_{u'}]$ where u=round $(N[1-(1-\beta)\gamma])$ and u'=round(N$[(1+\beta)\gamma]$). Here round(r) equals the nearest integer to r and the system parameters $0<\beta$, $\gamma<<1$. Let m and M be the mean values of the elements of $\underline{s}_L$ and $\underline{s}_H$ respectively. Apply the point operator P[x]=255*(x-m)/(M-m) to each element of $\underline{X}$ to get $\underline{X}'$.

Find the L-level DWT of $\underline{X}'$. Let $\underline{X}_A$ be its DC subband.

Partition the $\underline{X}_A$ into random non overlapping nR rectangles; calculate $\mu$ such that $\mu(i)$ is the mean value of the coefficients within rectangle i, $i\leq nR$.

Let $\mu_i:=[\mu(n(i-1)+1), \ldots, \mu(ni-1), \mu(ni)]i\leq R$. Use $Q_0$ and $Q_1$ to quantize: for $i\leq R$, if $\underline{w}(i)=0$, quantize $\mu^i$ using $Q_0$ else quantize $\mu^i$ using $Q_1$. Concatenating the quantized $\{\mu^i\}$ we get $\hat{\mu}$.

Find the differences between the original statistics and the quantized statistics: $\underline{d}=\hat{\mu}-\mu$.

Generate a pseudo-random sequence $\underline{\rho}=[\rho_{ij}]$ in the spatial (i.e. the original image) domain as follows: Choose $p_{ij}$ randomly and uniformly from $\{0,1\}$ if $s_t<X_{ij}<s_{t'}$, where t'=round(N$\gamma$) and t=round(N$(1-\gamma)$); otherwise set $p_{ij}=0$. Now apply L-level DWT to the matrix $\underline{\rho}$, extract the DC subband of the output and call it $\underline{\rho}_W$. Now compute the corresponding statistics similar to the step Compute the scaling factors $\underline{\alpha}$ such that $\underline{\alpha}(i)=\underline{d}(i)/\underline{\mu}_\rho(i)$, $i\leq nR$.

For each rectangle whose index is i, multiply all coefficients of $\underline{\rho}_W$ within that rectangle by $\underline{\alpha}(i)$, let the resulting vector be $\hat{\rho}_W$.

Apply inverse DWT on $\hat{\rho}_W$, let the output be $\hat{\rho}$.

Compute the watermarked data: $\underline{X}''=\underline{X}'+\hat{\rho}$. Apply the inverse of the point operator (see step 1) on $\underline{X}''$ to get $\hat{X}$.

Decoding (Input $\underline{Y}$):

Similar to first part of the encoding above, find the corresponding point operator on $\underline{Y}$. Now apply the operator to $\underline{Y}$ and to the output apply L-level DWT, extract the DC subband and call it $\underline{Y}_A$.

Applying the partitioning procedure of the encoding above to $\underline{Y}$ and find its statistics $\mu_Y$. Let $\mu_Y(i)$ be the ith element.

Using $Q_0$ and $Q_1$, now is described how to carry out approximate ML estimation to find the decoded sequence $w_Y$: Let $\mu_Y^i:=[\mu_Y(n(i-1)+1), \ldots, \mu_Y(ni-1), \mu_Y(ni)]$. For rectangles indexed by $n(i-1)+1, \ldots, ni-1, ni$ $i\leq R$, let $r0(i)$ be the closest point to $\mu_Y^i$ among reconstruction points of $Q_0$; likewise let $r1(i)$ be the closest point to $\mu_Y^i$ among reconstruction points of $Q_1$. If $d_{l2}(\mu_Y^i, r0(i))<d_{l2}(\mu_Y^i, r1(i))$ then assign $\underline{w}_Y(i)=0$; otherwise $\underline{w}_Y^{(i)}=1$.

Compute $d(\underline{w}_Y, \underline{w})$. If the result is less than threshold T, declare that the watermark was detected, or otherwise not present.

Exemplary Computing System and Environment

FIG. 6 illustrates an example of a suitable computing environment 900 within which an exemplary non-local QIM watermarker, as described herein, may be implemented (either fully or partially). The computing environment 900 may be utilized in the computer and network architectures described herein.

The exemplary computing environment 900 is only one example of a computing environment and is not intended to suggest any limitation as to the scope of use or functionality of the computer and network architectures. Neither should the computing environment 900 be interpreted as having any dependency or requirement relating to any one or combination of components illustrated in the exemplary computing environment 900.

The exemplary non-local QIM watermarker may be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The exemplary non-local QIM watermarker may be described in the general context of computer-executable instructions, such as program modules, being executed by a computer. Generally, program modules include routines, programs, objects, components, data structures, etc. that perform particular tasks or implement particular abstract data types. The exemplary non-local QIM watermarker may also be practiced in distributed computing environments where tasks are performed by remote processing devices that are linked through a communications network. In a distributed computing environment, program modules may be located in both local and remote computer storage media including memory storage devices.

The computing environment 900 includes a general-purpose computing device in the form of a computer 902. The components of computer 902 can include, by are not limited to, one or more processors or processing units 904, a system memory 906, and a system bus 908 that couples various system components including the processor 904 to the system memory 906.

The system bus 908 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 902 typically includes a variety of computer readable media. Such media can be any available media that is accessible by computer 902 and includes both volatile and non-volatile media, removable and non-removable media.

The system memory 906 includes computer readable media in the form of volatile memory, such as random access memory (RAM) 910, and/or non-volatile memory, such as read only memory (ROM) 912. A basic input/output system (BIOS) 914, containing the basic routines that help to transfer information between elements within computer 902, such as during start-up, is stored in ROM 912. RAM 910 typically contains data and/or program modules that are immediately accessible to and/or presently operated on by the processing unit 904.

Computer 902 may also include other removable/non-removable, volatile/non-volatile computer storage media. By way of example, FIG. 6 illustrates a hard disk drive 916 for reading from and writing to a non-removable, non-volatile magnetic media (not shown), a magnetic disk drive 918 for reading from and writing to a removable, non-volatile magnetic disk 920 (e.g., a "floppy disk"), and an optical disk drive 922 for reading from and/or writing to a removable, non-volatile optical disk 924 such as a CD-ROM, DVD-ROM, or other optical media. The hard disk drive 916, magnetic disk drive 918, and optical disk drive 922 are each connected to the system bus 908 by one or more data media interfaces 925. Alternatively, the hard disk drive 916, magnetic disk drive 918, and optical disk drive 922 can be connected to the system bus 908 by one or more interfaces (not shown).

The disk drives and their associated computer-readable media provide non-volatile storage of computer readable instructions, data structures, program modules, and other data for computer 902. Although the example illustrates a hard disk 916, a removable magnetic disk 920, and a removable optical disk 924, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 916, magnetic disk 920, optical disk 924, ROM 912, and/or RAM 910, including by way of example, an operating system 926, one or more application programs 928, other program modules 930, and program data 932. Each of such operating system 926, one or more application programs 928, other program modules 930, and program data 932 (or some combination thereof) may include an embodiment of an amplitude normalizer, a transformer, a partitioner, a segment-statistics calculator, a segment quantizer, an delta-sequence finder, and a signal marker.

A user can enter commands and information into computer 902 via input devices such as a keyboard 934 and a pointing device 936 (e.g., a "mouse"). Other input devices 938 (not shown specifically) may include a microphone, joystick, game pad, satellite dish, serial port, scanner, and/or the like. These and other input devices are connected to the processing unit 904 via input/output interfaces 940 that are coupled to the system bus 908, but may be connected by other interface and bus structures, such as a parallel port, game port, or a universal serial bus (USB).

A monitor 942 or other type of display device can also be connected to the system bus 908 via an interface, such as a video adapter 944. In addition to the monitor 942, other output peripheral devices can include components such as speakers (not shown) and a printer 946 which can be connected to computer 902 via the input/output interfaces 940.

Computer 902 can operate in a networked environment using logical connections to one or more remote computers, such as a remote computing device 948. By way of example, the remote computing device 948 can be a personal computer, portable computer, a server, a router, a network computer, a peer device or other common network node, and the like. The remote computing device 948 is illustrated as a portable computer that can include many or all of the elements and features described herein relative to computer 902.

Logical connections between computer 902 and the remote computer 948 are depicted as a local area network (LAN) 950 and a general wide area network (WAN) 952. Such networking environments are commonplace in offices, enterprise-wide computer networks, intranets, and the Internet.

When implemented in a LAN networking environment, the computer 902 is connected to a local network 950 via a network interface or adapter 954. When implemented in a WAN networking environment, the computer 902 typically includes a modem 956 or other means for establishing communications over the wide network 952. The modem 956, which can be internal or external to computer 902, can be connected to the system bus 908 via the input/output interfaces 940 or other appropriate mechanisms. It is to be appreciated that the illustrated network connections are exemplary and that other means of establishing communication link(s) between the computers 902 and 948 can be employed.

In a networked environment, such as that illustrated with computing environment 900, program modules depicted relative to the computer 902, or portions thereof, may be stored in a remote memory storage device. By way of example, remote application programs 958 reside on a memory device of remote computer 948. For purposes of illustration, application programs and other executable program components such as the operating system are illustrated herein as discrete blocks, although it is recognized that such programs and components reside at various times in different storage components of the computing device 902, and are executed by the data processor(s) of the computer.

Computer-Executable Instructions

An implementation of an exemplary non-local QIM watermarker may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Exemplary Operating Environment

FIG. 6 illustrates an example of a suitable operating environment 900 in which an exemplary non-local QIM watermarker may be implemented. Specifically, the exemplary non-local QIM watermarker(s) described herein may be implemented (wholly or in part) by any program modules 928-930 and/or operating system 926 in FIG. 6 or a portion thereof.

The operating environment is only an example of a suitable operating environment and is not intended to suggest any limitation as to the scope or use of functionality of the exemplary non-local QIM watermarker(s) described herein. Other well known computing systems, environments, and/or configurations that are suitable for use include, but are not limited to, personal computers (PCs), server computers, hand-held or laptop devices, multiprocessor systems, microprocessor-based systems, programmable consumer electronics, wireless phones and equipments, general- and special-purpose appliances, application-specific integrated circuits (ASICs), network PCs, minicomputers, mainframe computers, distributed computing environments that include any of the above systems or devices, and the like.

Computer Readable Media

An implementation of an exemplary non-local QIM watermarker may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

CONCLUSION

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method facilitating protection of digital signals, the method comprising:
    normalizing amplitude of a subject digital signal;
    transforming the normalized signal;
    partitioning the normalized signal transform into segments by pseudorandomly segmenting the normalized signal transform using a secret key, wherein the partitioning comprises pseudorandomly segmenting the normalized signal transform, wherein such segments have the ability to overlap;
    for one or more segments:
        calculating statistics of a segment that are representative of that segment;
        quantizing such statistics of a segment to generate a quantized value of that segment;
        measuring the distance between such statistics of a segment and the quantized value of that segment;

determining whether a watermark is present in the digital signal based upon the quantized values of the one or more segments using quantization index modulation (QIM), wherein such QIM utilizes non-local characteristics of the signal and wherein the non-local characteristics comprise statistics representative of one or more pseudorandomly dimensioned segments of the signal.

2. A method as recited in claim 1, wherein measuring the distance comprises using perceptual distortion metrics.

3. A method as recited in claim 1 further comprising:
determining an indication of confidence based upon the measured distances of the measuring;
indicating an indication of confidence.

4. A method as recited in claim 1 further comprising indicating whether a watermark is present.

5. A method as recited in claim 1 further comprising indicating whether a watermark is present, wherein such indication is selected from a group consisting of "present," "not present," and "unknown."

6. A method as recited in claim 1, wherein the partitioning comprises pseudorandomly segmenting the normalized signal transform, wherein such segments are adjacent and non-contiguous.

7. A method as recited in claim 1, wherein the transforming comprises finding a low frequency subband.

8. A method as recited in claim 1, wherein the transforming comprises finding a significant frequency subband.

9. A method as recited in claim 1, wherein the statistics of the calculating comprises one or more finite order moments of a segment.

10. A computer comprising one or more computer-readable media having computer-executable instructions that, when executed by the computer, perform the method as recited in claim 1.

11. One or more computer-readable storage media having computer-executable instructions thereon that, when executed by a computer, perform acts for facilitating protection of digital signals, the acts comprising:
normalizing amplitude of a subject digital signal;
transforming the normalized signal;
partitioning the normalized signal transform into segments by pseudorandomly segmenting the normalized signal transform using a secret key, wherein the partitioning comprises pseudorandomly segmenting the normalized signal transform, wherein such segments have the ability to overlap;
for one or more segments:
calculating statistics of a segment that are representative of that segment;
quantizing such statistics of a segment to generate a quantized value of that segment;
measuring the distance between such statistics of a segment and the quantized value of that segment;
determining whether a watermark is present in the digital signal based upon the quantized values of the one or more segments using quantization index modulation (QIM), wherein such QIM utilizes non-local characteristics of the signal and wherein the non-local characteristics comprise statistics representative of one or more pseudorandomly dimensioned segments of the signal.

12. One or more computer-readable storage media as recited in claim 11, wherein measuring the distance comprising using perceptual distortion metrics.

13. One or more computer-readable storage media as recited in claim 11 further comprising:
determining an indication of confidence based upon the measured distances of the measuring;
indicating an indication of confidence.

14. One or more computer-readable storage media as recited in claim 11 further comprising indicating whether a watermark is present.

15. One or more computer-readable storage media as recited in claim 11 further comprising indicating whether a watermark is present, wherein such indication is selected from a group consisting of "present," "not present," and "unknown."

16. One or more computer-readable storage media as recited in claim 11, wherein the partitioning comprises pseudorandomly segmenting the normalized signal transform, wherein such segments are adjacent and non-contiguous.

17. One or more computer-readable storage media as recited in claim 11, wherein the transforming comprises finding a low frequency subband.

18. One or more computer-readable storage media as recited in claim 11, wherein the transforming comprises finding a significant frequency subband.

19. One or more computer-readable storage media as recited in claim 11, wherein the statistics of the calculating comprises one or more finite order moments of a segment.

20. A method facilitating protection of digital signals, the method comprising:
partitioning a subject digital signal into segments by pseudorandomly segmenting the signal using a secret key, wherein the partitioning comprises pseudorandomly segmenting the signal, wherein such segments have the ability to overlap;
for one or more segments:
calculating statistics of a segment that are representative of that segment;
quantizing such statistics of a segment to generate a quantized value of that segment;
determining whether a watermark is present in the digital signal based upon the quantized values of the one or more segments using quantization index modulation (QIM), wherein such QIM utilizes non-local characteristics of the signal and wherein the non-local characteristics comprise statistics representative of one or more pseudorandomly dimensioned segments of the signal.

21. A method as recited in claim 20 further comprising:
normalizing amplitude of the subject digital signal;
transforming the normalized signal.

22. A method as recited in claim 20 further comprising:
for one or more segments, measuring the distance between such statistics of a segment and the quantized value of that segment;
determining an indication of confidence based upon the measured distances of the measuring;
indicating an indication of confidence.

23. A method as recited in claim 20 further comprising indicating whether a watermark is present.

24. A method as recited in claim 20 further comprising indicating whether a watermark is present, wherein such indication is selected from a group consisting of "present," "not present," and "unknown."

25. A method as recited in claim 20, wherein the partitioning comprises pseudorandomly segmenting the signal, wherein such segments are adjacent and non-contiguous.

26. A method as recited in claim 20, wherein the statistics of the calculating comprises one or more finite order moments of a segment.

27. A computer comprising one or more computer-readable media having computer-executable instructions that, when executed by the computer, perform the method as recited in claim 20.

28. A system for facilitating protection of digital signals comprising:
means for partitioning a subject digital signal into segments by pseudorandomly segmenting the signal using a secret key, wherein the partitioning comprises pseudorandomly segmenting the signal, wherein such segments have the ability to overlap;
for one or more segments:
means for calculating statistics of a segment that are representative of that segment;
means for quantizing such statistics of a segment to generate a quantized value of that segment;
means for determining whether a watermark is present in the digital signal based upon the quantized values of the one or more segments using quantization index modulation (QIM), wherein such QIM utilizes non-local characteristics of the signal and wherein the non-local characteristics comprise statistics representative of one or more pseudorandomly dimensioned segments of the signal.

29. A system as recited in claim 28 further comprising:
means for normalizing amplitude of the subject digital signal;
means for transforming the normalized signal.

30. A system as recited in claim 28 further comprising:
for one or more segments, means for measuring the distance between such statistics of a segment and the quantized value of that segment;
means for determining an indication of confidence based upon the measured distances of the measuring;
means for indicating an indication of confidence.

31. A system as recited in claim 28 further comprising means for indicating whether a watermark is present.

32. A system as recited in claim 28 further comprising means for indicating whether a watermark is present, wherein such indication is selected from a group consisting of "present," "not present," and "unknown."

33. A system as recited in claim 28, wherein the partitioning comprises pseudorandomly segmenting the signal, wherein such segments are adjacent and non-contiguous.

34. A system as recited in claim 28, wherein the statistics of the calculating comprises one or more finite order moments of a segment.

* * * * *